C. H. HOWARD & H. M. PFLAGER.
CAR TRUCK.
APPLICATION FILED JUNE 10, 1912.
1,061,078.
Patented May 6, 1913.
2 SHEETS—SHEET 1.
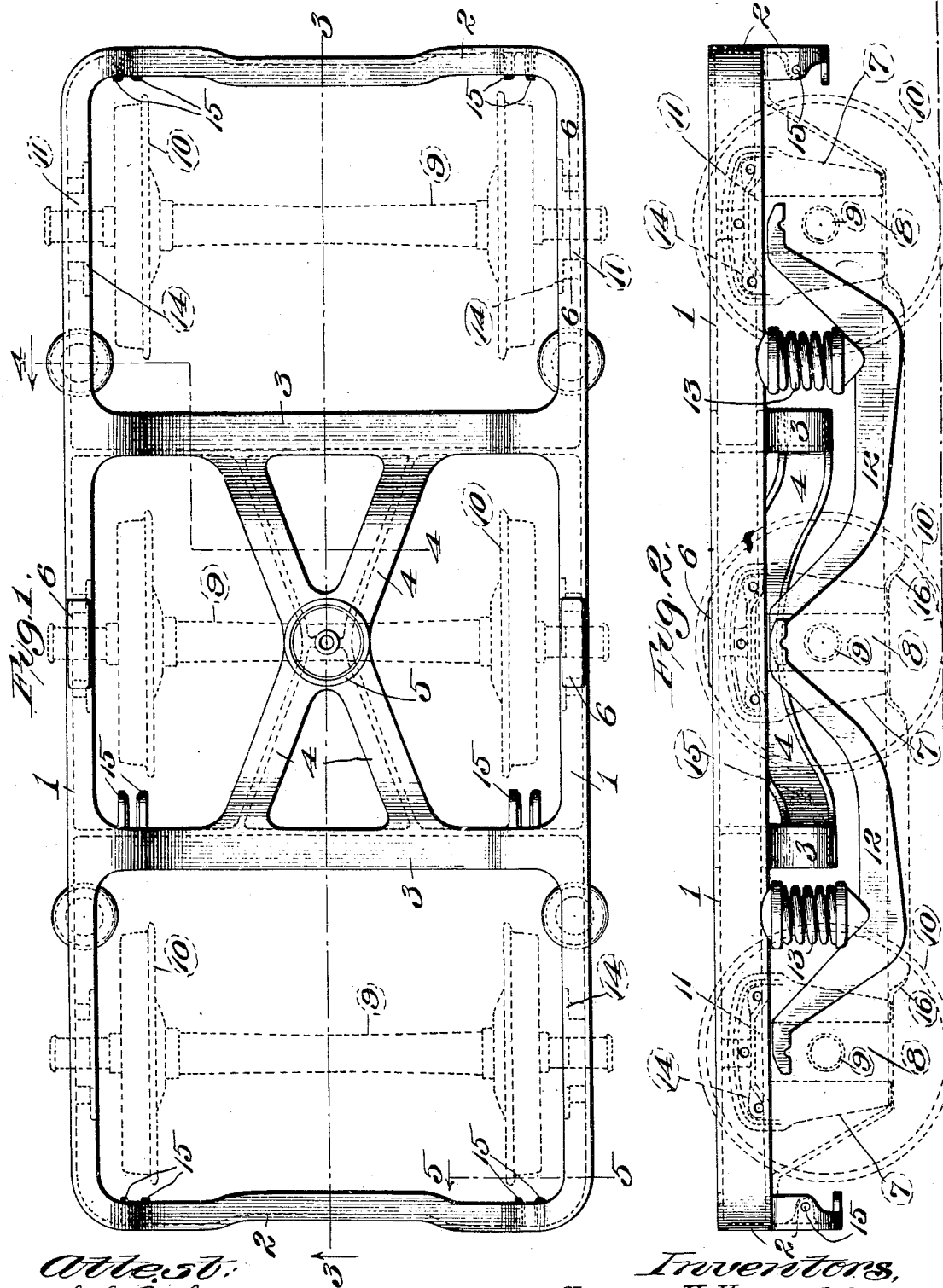
Attest:
J. A. Bishop
Wm. James
Inventors,
Clarence H. Howard &
Harry M. Pflager,
by F. R. Cornwall
Atty.

C. H. HOWARD & H. M. PFLAGER.
CAR TRUCK.
APPLICATION FILED JUNE 10, 1912.
1,061,078.
Patented May 6, 1913.
2 SHEETS—SHEET 2.
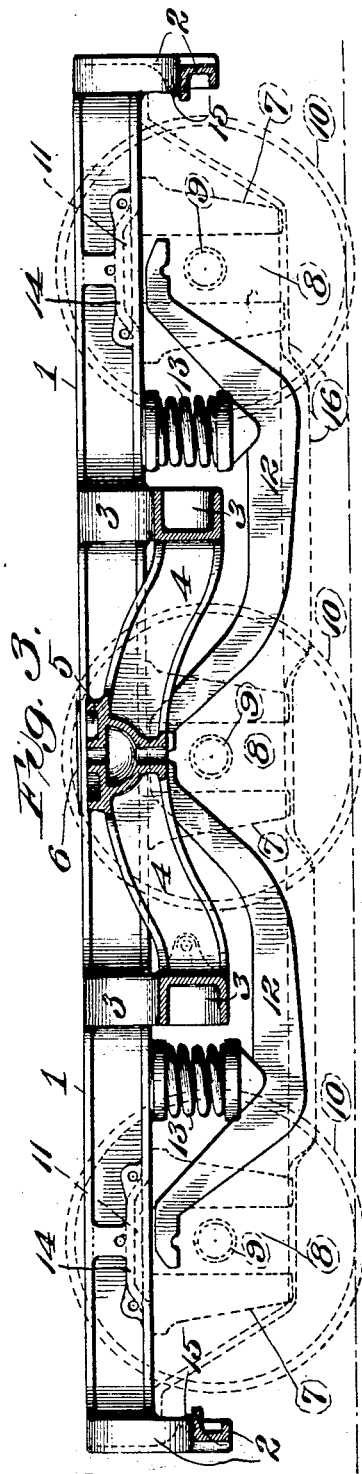
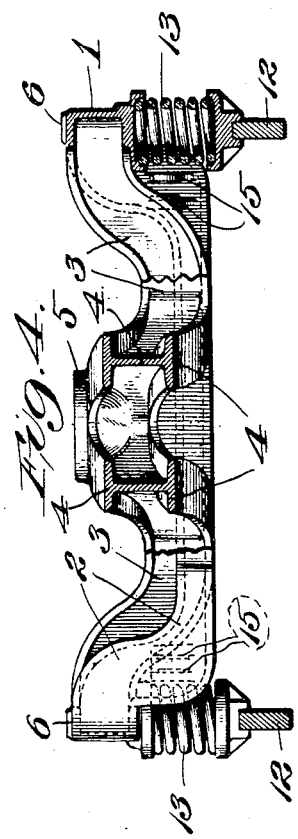
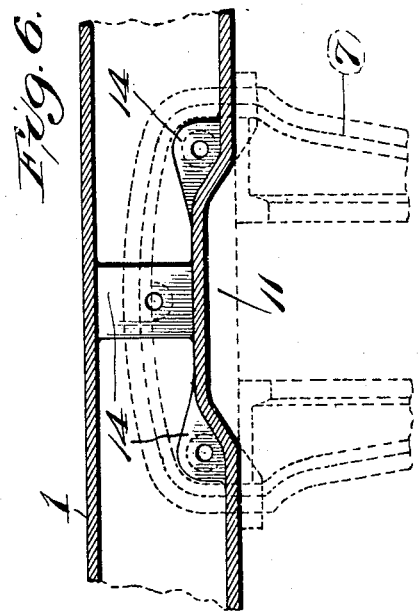
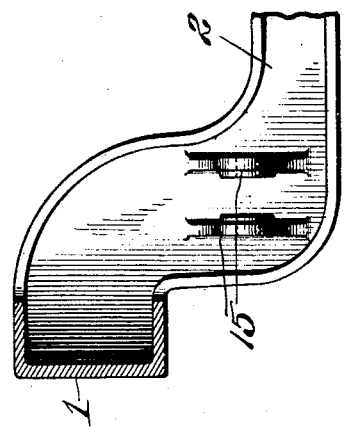
Inventors,
Clarence H. Howard
Harry M. Pflager,
by F. R. Cornwall
Atty.

UNITED STATES PATENT OFFICE.

CLARENCE H. HOWARD AND HARRY M. PFLAGER, OF ST. LOUIS, MISSOURI, ASSIGNORS TO COMMONWEALTH STEEL COMPANY, OF ST. LOUIS, MISSOURI, A CORPORATION OF NEW JERSEY.

CAR-TRUCK.

1,061,078.  Specification of Letters Patent.  Patented May 6, 1913.

Application filed June 10, 1912.   Serial No. 702,744.

*To all whom it may concern:*

Be it known that we, CLARENCE H. HOWARD and HARRY M. PFLAGER, citizens of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a plan view of a car truck of our improved construction. Fig. 2 is a side elevation of the truck. Fig. 3 is a vertical section taken longitudinally through the center of the truck. Fig. 4 is a transverse section taken approximately on the line 4—4 of Fig. 1. Fig. 5 is a detail section taken on the line 5—5 of Fig. 1. Fig. 6 is a detail section taken on the line 6—6 of Fig. 1.

Our invention relates to a railway car truck of the six wheel type, the principal object of our invention being to provide a comparatively simple truck frame wherein the wheel pieces, transoms, and center bolsters are all cast integral, thereby forming a one piece structure having great strength and rigidity, combined with lightness of weight.

Heretofore in the construction of trucks of the type to which our invention pertains, it has been the practice to provide truck frames having the wheel pieces and transoms formed in one casting and the center bolster in a separate casting, the latter carried by swing hangers from the transoms, and in our improved constructions these parts, namely the center bolster and the transoms, are formed integral in order to greatly simplify and cheapen the cost of manufacture of the truck frames and provide a six wheel truck having a much shorter wheel base than the type of six wheel trucks now in general use.

By providing a frame wherein the transoms and center bolster are integral the swing hangers are eliminated and the wheel base of the truck can be materially reduced, thereby enabling the truck to traverse the curves with less resistance than a truck of comparatively long wheel base and likewise a truck having a comparatively short wheel base can traverse shorter curves than the longer truck. The truck frame herein shown and described is of the same general type and is an improvement upon the truck frames shown in U. S. Patents #774,492 and 903,191.

As shown in the accompanying drawing the frame of our improved truck comprises side rails or wheel pieces 1, end rails 2, transoms 3 and center bolster 4 all of which parts are formed integral preferably by casting. The wheel pieces 1 are preferably channel shaped in cross section with the horizontal flanges projecting inwardly and the end pieces 2 which occupy a plane slightly below the plane occupied by the wheel pieces are likewise channel shape in cross section.

The transoms 3 are preferably channel shape in cross section with their horizontally disposed flanges projecting outwardly toward the ends of the truck frame. The arms or members of the center bolster 4 are preferably of I-beam shape in cross section.

It will be readily understood that the various parts just mentioned may be of any desired shape in cross section, as for instance; I—T—L—Z or of inverted U-shape.

The central portions of the transoms 3 are depressed and occupy a plane slightly below the plane occupied by the wheel pieces 1.

The center bolster 4 is X-shape and the outer ends of the arms thereof are formed integral with the central portions of the transoms 3. This center bolster is slightly arched so that the center bearing 5 formed on top of its central portion occupies substantially the same plane with the top of the wheel pieces 1.

Formed integral with the wheel pieces 1 at the centers thereof are lugs or plates 6, which perform the function of side bearings. Fixed in any suitable manner to the side bars or wheel pieces and depending therefrom, are pedestals 7 and positioned therein are journal boxes 8 which receive the ends of axles 9 provided with the usual wheels 10. The undersides of the wheel pieces 1 are recessed as designated by 11 immediately above the openings between the jaws of the pedestals in order to accommodate the ends of the equalizing bars 12 which latter are arranged between the journal boxes 8 with their end portions resting thereupon. Interposed between these equalizing bars and the wheel pieces 1 are heavy coiled springs 13. In order to reinforce and strengthen the wheel pieces at the points where the same are recessed to receive the ends of the equalizing bars, vertically disposed longitudinally extending walls or webs 14 are formed integral with the inner portions of the horizontally disposed webs of said wheel pieces, which webs or walls extend slightly beyond the ends of said recesses. Formed on or fixed to the end rails 2 and to one of the transoms 3 are pairs of lugs 15, to which the upper ends of the brake hangers are pivotally connected.

A tie bar or tension member 16 extends longitudinally beneath each series of pedestals 7, and its ends are fixed in any suitable manner to the end portions of the wheel pieces 1.

A truck frame of our improved construction is comparatively simple, can be easily and cheaply produced owing to the fact that its essential parts are formed in a single piece and by forming the center bolster integral with the transoms a comparatively short frame is produced, which construction is particularly desirable in six wheel trucks, for the reason that a truck having a comparatively short wheel base will take curves with much less resistance and will traverse shorter curves than trucks having a comparatively long wheel base.

It will be readily understood that minor changes in the size, form and construction of the various parts of our improved truck can be made and substituted for those herein shown and described, without departing from the spirit of our invention, the scope of which is set forth in the appended claims.

We claim:

1. A truck frame of the class described, comprising wheel pieces, a pair of transoms, the central portions of which are depressed with respect to the wheel pieces and a center bolster connecting the depressed center portions of the transoms all of which parts are cast integral.

2. A truck frame, comprising wheel pieces, end rails, transoms, the central portions of which are depressed with respect to the wheel pieces and a center bolster connecting the depressed center portions of said transoms all of which parts are formed integral.

3. A truck frame comprising wheel pieces, end rails, a pair of transoms, the central portions of which are depressed with respect to the wheel pieces and an X-shaped center bolster connecting the depressed center portions of said transoms all of which parts are cast integral.

4. In a car truck, a rectangular frame, a pair of transoms cast integral therewith, the central portions of which transoms are depressed with respect to the said members of the frame, and a substantially X-shaped center bolster connecting the depressed center portions of said transoms.

5. A car truck frame comprising wheel pieces, end rails, a pair of transoms, a center bolster connecting the central portions of the transoms, all of which parts are cast integral, and pedestals depending from the wheel pieces between the transoms and between the end rails and transoms.

6. A six wheel truck frame comprising wheel pieces, a pair of transoms cast integral therewith, an X-shaped center bolster cast integral with and connecting the central portions of the transoms, pedestals depending from the wheel pieces between the transoms and pedestals depending from the wheel pieces between the transoms and the ends of said wheel pieces.

7. A truck frame comprising wheel pieces, transoms cast integral therewith, the central portions of which are depressed with respect to the wheel pieces, a center bolster cast integral with said transoms, pedestals depending from the wheel pieces and the undersides of which wheel pieces are recessed above the openings in the pedestals.

8. In a truck frame of the class described, a pair of wheel pieces, a pair of transoms, a center bolster connecting the central portions of the transoms, all of which parts are cast integral, and side bearing plates integral with the central portions of the wheel pieces.

9. A truck frame comprising wheel pieces, a pair of transoms integral therewith, a center bolster integral with and connecting the central portions of the transoms, pedestals depending from the wheel pieces between the transoms and between said transoms and the ends of the wheel pieces, and the undersides of which wheel pieces between the pedestals are recessed to accommodate the ends of the equalizer bars.

10. A truck frame comprising wheel pieces, end rails, transoms, a center bolster connecting the central portions of said transoms, pairs of brake hanger lugs depending from one of the transoms, and pairs of brake hanger lugs depending from the end rails, all of which parts are cast integral.

11. A truck frame comprising wheel pieces, end rails, transoms, a center bolster connecting the central portions of said transoms, pairs of brake hanger lugs depending from one of the transoms, pairs of brake hanger lugs depending from the end rails, and side bearing plates on the central portions of the wheel pieces, all of which parts are cast integral.

12. In a truck frame of the class described, a pair of wheel pieces, a pair of transoms, the central portions of which are depressed with respect to the wheel pieces, an X-shaped center bolster connecting the depressed central portions of said transoms, and a center bearing plate on said X-shaped bolster, all of which parts are cast integral.

13. In a truck frame of the class described, a pair of wheel pieces, a pair of transoms, an X-shaped center bolster connecting the central portions of said transoms, side bearing members on the central portions of the wheel pieces, and a center bearing plate on said X-shaped bolster, all of which parts are cast integral.

14. In a truck frame of the class described, a pair of wheel pieces, a pair of transoms, pairs of brake hanger lugs projecting from one of said transoms, an X-shaped center bolster connecting the central portions of said transoms, side bearing members on the central portions of the wheel pieces, and a center bearing plate on said X-shaped bolster, all of which parts are cast integral.

15. In a car truck the combination with a truck frame, comprising wheel pieces, a pair of transoms and a center bolster connecting the center portions of said transoms, all of which parts are cast integral, of equalizer bars supported by the journal boxes of the truck, and springs supported directly upon the equalizer bars, and which springs directly support the truck frame.

16. A car truck frame, comprising wheel pieces, a pair of transoms, the central portions of which are depressed with respect to said wheel pieces, a substantially X-shaped bolster connecting the central portions of said transoms, and a center bearing on the central portion of the center bolster, which center bearing occupies substantially the same horizontal plane with the tops of the wheel pieces, all of which parts are cast integral.

17. In a car truck, an integral truck frame comprising wheel pieces, a pair of transoms, the central portions of which are depressed with respect to the wheel pieces, a substantially X-shaped center bolster connecting the depressed central portions of said transoms, a center bearing on the center bolster, which bearing is substantially in the same horizontal plane with the tops of the wheel pieces, and side bearing plates on the central portions of the wheel pieces.

In testimony whereof we hereunto affix our signatures in the presence of two witnesses, this 28th day of May, 1912.

CLARENCE H. HOWARD.
HARRY M. PFLAGER.

Witnesses:
  HAL C. BELLVILLE,
  M. A. HANDEL.